United States Patent Office 3,024,204
Patented Mar. 6, 1962

3,024,204
SALT HYDRATE-BF$_3$ -HgX$_2$ CATALYST
Harmon M. Knight, La Marque, and Joe T. Kelly, Dickinson, Tex., assignors, by mesne assignments, to Standard Oil Company, Chicago, Ill., a corporation of Indiana
No Drawing. Filed Oct. 27, 1958, Ser. No. 769,598
3 Claims. (Cl. 252—433)

This invention relates to a catalyst adapted for conversions of hydrocarbons and processes utilizing the catalyst.

An object of the invention is a catalyst of the ferric pyrophosphate-BF$_3$ type set out in U.S. 2,824,146, which does not require additional BF$_3$. A further object is a solid catalyst containing ferric pyrophosphate hydrate and BF$_3$. Other objects will become apparent in the course of the detailed description of the invention.

It has been discovered that an effective catalyst for many hydrocarbon reactions, particularly polymerization, is obtained by intermingling ferric pyrophosphate hydrate-BF$_3$ complex, as hereinafter defined, and mercuric halide, in a hereinafter defined ratio, where the halide is chloride or bromide.

The catalyst composition consists essentially of two solid members. One member is a complex having the empirical formula Fe$_4$(P$_2$O$_7$)$_3 \cdot a$H$_2$O$\cdot b$BF$_3$ where "$a$" is at least 1 and "$b$" is from 1 to "$a$." Ferric pyrophosphate forms hydrates with water, which hydrates may contain from 1 to as many as 18 moles of water of hydration per mole of ferric pyrophosphate. In general, it is preferred that the complex be formed from ferric pyrophosphate hydrate containing from 6 to 9 moles of water of hydration per mole of ferric pyrophosphate. Boron trifluoride must be present in the complex; apparently the BF$_3$ complexes with the hydrated water to form a solid material. In order to attain effective catalytic activity, it is necessary that the complex contain at least 1 mole of BF$_3$ per mole of the hydrate, and preferably the complex should contain 1 mole of BF$_3$ for each mole of water of hydration present. To illustrate, when ferric pyrophosphate.6H$_2$O is the hydrate, the complex must contain at least 1 mole of BF$_3$ and preferably contains 6 moles of BF$_3$; these two complexes may be written as Fe$_4$(P$_2$O$_7$)$_3$.6H$_2$O.BF$_3$ and Fe$_4$(P$_2$O$_7$)$_3$.6H$_2$O.6BF$_3$.

The BF$_3$ and the hydrate are reacted to form a solid material containing complexed BF$_3$. When the salt hydrate and BF$_3$ are contacted in a closed vessel, the BF$_3$ partial pressure drops very rapidly at first and then gradually approaches a constant value. It appears that a very rapid reaction between the BF$_3$ and some of the water of hydration takes place. This initially rapid reaction is then followed by a relatively slow reaction between the remaining molecules of hydrate water and additional BF$_3$. In the case of ferric pyrophosphate containing 11 moles of hydrate water per mole of the salt, it appears that 4 or 5 moles of hydrate water are rapidly reacted. However, stirring of finely powdered hydrate salt in the presence of excess BF$_3$ at about room temperature for a period of about 20 hours, results in the reaction of 1 mole of BF$_3$ for each mole of hydrate water present in the ferric pyrophosphate hydrate.

The solid complex of ferric pyrophosphate hydrate and BF$_3$ has moderate catalytic activity and may be used for purposes such as polymerizing isobutylene. This complex has no activity for the difficult ethylene-isobutane alkylation reaction or ethylene polymerization. It has been found that a catalyst system of very great polymerization activity is obtained by intermingling the defined ferric pyrophosphate hydrate-BF$_3$ complex with mercuric chloride or mercuric bromide in a weight ratio of ferric pyrophosphate to HgX$_2$ from about 1 to about 75. The composition consisting essentially of the defined complex and HgX$_2$ in this ratio is very effective for promoting the difficult ethylene polymerization reaction. The bromide containing catalyst is preferred for ethylene-isobutane alkylation.

The defined composition of complex and HgX$_2$ may be used as such; the composition may be used in the form of a powder or shaped into pellets. Or, the catalyst composition may be supported on a carrier such as alumina, pumice, silica, silica alumina and carbon.

The catalyst may be used at any temperature below the temperature at which the salt hydrate decomposes, that is, loss of all its water of hydration. The temperature of operation may be as low as −25° C. or even lower. Temperatures as high as 150° C. and even higher may be used with some of the hydrates which have relatively high decomposition temperatures. For example, ferric pyrophosphate.5H$_2$O has been heated for 20 hours at 168° C. without losing water of hydration. More usually the temperature of operation will be below about 30° C. Low temperatures favor the formation of the hydrocarbons having 6 to 7 carbon atoms and diisopropyl in ethylene-isobutane reaction. It is preferred to operate this alkylation process at a temperature between about −25° C. and +5° C.

Sufficient pressure is maintained on the system to keep a substantial portion of the hydrocarbons charged in the liquid state. In general, pressures will be between about 50 and 1000 p.s.i. and preferably between about 100 and 600 p.s.i. for alkylation or polymerization.

The reactants in the hydrocarbon charge to the alkylation process are isoparaffin, or aromatic and olefin. The olefin contains from 2 to about 12 carbon atoms. Examples of suitable olefins are ethylene, propylene, butene-2, hexene and octene; in addition to these, the olefin polymers obtained from propylene and/or butylene are also suitable for use in the process, such as codimer, propylene trimer, propylene tetramer and butylene trimer. It is preferred to operate with ethylene or propylene.

The aromatic hydrocarbons must be alkylatable by the particular olefin used. It is self-evident that an aromatic hydrocarbon which contains alkyl substituents positioned so that steric hindrance would prevent or greatly reduce the possibility of alkylation with the particular olefin should not be subjected to the process. Examples of particularly suitable aromatic hydrocarbons are benzene, toluene, xylene, trimethylbenzenes, and the other alkyl analogues, such as propyl and butyl, the naphthalene aromatic hydrocarbons, such as the mono and di-substituted methylnaphthalenes.

The isoparaffin reactant is defined as a paraffinic hydrocarbon which has a tertiary hydrogen atom, i.e., paraffins which have a hydrocarbon atom attached to a tertiary carbon atom. Examples of these are isobutane, isopentane (2-methylbutane), 2-methylpentane, 2-methylhexane, 3-methylhexane, 2,3-dimethylbutane (di-isopropyl) and 2,4-dimethylhexane. Thus the isoparaffins usable as one reactant in the process contain from 4 to 8 carbon atoms.

In the isoparaffin-olefin system, the alkylation reaction is more favored as the mole ratio of isoparaffin to olefin increases. In general, the isoparaffin to olefin mole ratio in the hydrocarbon charge should be at least 1. More than this amount is good and it is desirable to have an isoparaffin to olefin ratio between about 2 and 25 and in some cases more, for example, as much as 50. It is preferred to operate with an isoparaffin to olefin mole ratio of between about 5 and 15.

The presence of non-reactive hydrocarbons in the hydrocarbon charge is not detrimental unless the reactants become excessively diluted. For example, the isoparaffin may also contain isomers of the normal configuration. The olefins may contain paraffins of the same carbon number. Mixtures of 2 or more isoparaffins or 2 or more aromatic hydrocarbons, or 2 or more olefins may be charged. In general, when a particular product distribution is desired, it is preferable to operate with a single isoparaffin and a single olefin, for example, technical grade isobutane and ethylene, i.e., about 95% purity.

The reactants may be mixed together before they are charged into the reactor. Or, they may be charged into the reactor separately. Or, a portion of the olefin may be blended with the isoparaffin or aromatic before introduction into the reactor and the remainder of the olefin injected into the reactor. The charge may be introduced all at one point into the reactor or it may be introduced at 2 or more points. The alkylation reaction is somewhat exothermic and temperature control is facilitated by introducing the olefin into the reactor at more than one point.

The contacting of the isoparaffin or aromatic hydrocarbon and the olefin in the presence of the defined catalyst pair is continued until an appreciable amount of alkylate has been formed. In batch reactions, it is possible to virtually extinguish the olefin, i.e., convert substantially 100% of the olefin by a sufficiently long period of contacting. When operating in a continuous flow system, it may be desirable to have a time of contacting such that substantial amounts of olefin are not converted and obtain the complete conversion of the olefin by a recycle operation. The time of reaction will be determined by the type of hydrocarbons charged, the ratio of isoparaffin or aromatic to olefin, the degree of mixing in the contacting zone and the catalyst usage. A few tests will enable one to determine the optimum time of contacting for the particular system of operating conditions being tried.

The catalyst system is distinguished by its ability to polymerize ethylene. Other olefins such as propylene, butylene, isobutylene, etc., are polymerized by the catalyst system of the invention. Even in the presence of isobutane, the system containing mercuric chloride preferentially polymerizes ethylene and other olefins. The catalyst containing mercuric bromide is not as partial to the polymerization reaction. The polymerization reaction is carried out using the olefin in substantially the liquid state and otherwise under conditions similar to those described hereinabove for the alkylation reaction.

The hydrocarbon reaction may be carried out in a reactor which may be a vessel providing for a batch-type reaction, i.e., one wherein the desired amount of isoparaffin or aromatic and olefin are charged to a closed vessel containing the catalyst pair and the vessel then maintained at the desired temperature for the desired time. At the end of this time, the hydrocarbon product mixture and unreacted materials are withdrawn from the vessel and processed to separate the alkylate product from the unreacted materials and lower and higher molecular weight materials. The reaction may be carried out in a fixed bed operation wherein the reactants are flowed through a bed of catalyst, the space velocity being controlled so that the desired amount of reaction is obtained during the passage of the reactants through the bed. Under some conditions, a moving bed of catalyst may be utilized. In still another set of circumstances, a fluidized bed may be utilized with the incoming stream of reactants providing the energy for the fluidization of the catalyst. Other methods of operation common in the catalytic refining aspects of the petroleum industry utilizing solid catalyst may be readily devised.

Tests

For purposes of illustration, the results of comparable tests using a catalyst composition of the invention and the complex alone are set out below.

The tests were made as follows: 90 g. of $$Fe_4(P_2O_7)_3 \cdot 9H_2O$$

and 200 ml. of isobutane were charged to a dry 4-liter carbon steel bomb. The bomb was then placed in an ice bath and cooled. $BF_3$ was slowly added with care to avoid overheating of the salt as a result of the exothermic reaction. The bomb was gradually pressured to 250–300 p.s.i.g. with $BF_3$ and allowed to stand until the desired amount of $BF_3$ had been taken up, after which the bomb was depressured and evacuated. The $HgX_2$ (when used) was added and then 1000 g. of a blend of isobutane and ethylene were charged (3/1 molar I/O). The bomb was rocked 20 hours at 15°–25° C. and then sampled for Podbielniak distillation analysis.

*Test 1.*—Only 18 weight percent of alkylate were obtained when only the ferric pyrophosphate.$9H_2O.9BF_3$ complex was present in the reactor. This compares with an alkylate yield of about 30% when $BF_3$ alone is used as a catalyst in this same system.

*Test 2.*—In this test, mercuric bromide was used in conjunction with ferric pyrophosphate.$9H_2O$. Sufficient $BF_3$ was present in the complex to have a molar ratio of $BF_3$ to hydrate water of 0.8. The mercuric bromide was present in the reactor in an amount such that the ferric pyrophosphate to mercuric bromide weight ratio was 2.2. In this test all the ethylene reacted. The yield of total alkylate, based on ethylene charged was 178 weight percent; the product fractions consisted of isopentane, 12%, hexanes, 30%, octanes, 56% and nonanes and higher, 76%. The hexanes and octanes had essentially 0 bromine number; the nonane plus fraction had a bromine number of 17.

*Test 3.*—In this test, two runs were carried out at conditions identical except for the weight ratio of ferric pyrophosphate to mercuric chloride. Ferric pyrophosphate.$9H_2O$ and $BF_3$ were charged to the reactor to obtain a complex containing 0.8 mole of $BF_3$ per mole of hydrate water. In run 3a, the weight ratio of ferric pyrophosphate to mercuric chloride was 2.2. The total yield of product, based on ethylene charged—all of which was reacted— was 143 weight percent. The product consisted of isopentane, 8%, hexanes, 16%, and higher boiling materials, 119%. The higher boiling product had a bromine number of 34.

In Test 3b, the weight ratio of ferric pyrophosphate to mercuric chloride was 18.0. In this test, all of the ethylene charged was reacted. The yield of product based on ethylene charged was 117 weight percent, i.e., very little reaction other than polymerization took place. The product consisted of isopentane, 77%, hexanes, 13%, and higher boiling materials, 97%. The higher boiling material had a bromine number of 19.

*Test 4.*—In this test, ferric pyrophosphate.$6H_2O$ and $BF_3$ were complexed to obtain a solid material containing 0.3 mole of $BF_3$ per mole of hydrate water. The weight ratio of ferric pyrophosphate in this test to mercuric chloride was 2.2. The total yield of product was 114 based on ethylene charged—all of which was reacted. The product consisted of isopentane, 4%, hexanes, 7%, and higher boiling materials, 103%. The higher boiling material had a bromine number of 10.

Thus having described the invention, what is claimed is:

1. A composition consisting essentially of (1) a complex having the empirical formula $Fe_4(P_2O_7)_3 \cdot aH_2O \cdot bBF_3$ where "$a$" is at least 1 and "$b$" is from 1 to "$a$" and (2) $HgX_2$ where X is from the class consisting of chloride and bromide and where the weight ratio of said pyrophosphate to said halide is from about 1 to about 75.

2. A composition consisting essentially of (1) the complex $Fe_4(P_2O_7)_3 \cdot 9H_2O \cdot 9BF_3$ and (2) $HgCl_2$ where the weight ratio of said pyrophosphate to said chloride is about 2–5.

3. A composition consisting essentially of (1) the complex $Fe_4(P_2O_7)_3 \cdot 9H_2O \cdot 9BF_3$ and (2) $HgBr_2$, where the weight ratio of said pyrophosphate to said bromide is about 2–5.

References Cited in the file of this patent

UNITED STATES PATENTS

| | | |
|---|---|---|
| 2,471,130 | Vesterday | May 24, 1949 |
| 2,748,090 | Watkins | May 29, 1956 |
| 2,773,053 | Field et al. | Dec. 4, 1956 |
| 2,824,146 | Kelly et al. | Feb. 18, 1958 |
| 2,827,446 | Breslow | Mar. 18, 1958 |
| 2,851,503 | Shiffler | Sept. 9, 1958 |
| 2,852,576 | Fotis et al. | Sept. 16, 1958 |
| 2,863,925 | Starcher | Dec. 9, 1958 |